(12) United States Patent
Hagqvist et al.

(10) Patent No.: US 9,416,877 B2
(45) Date of Patent: Aug. 16, 2016

(54) COOLING DEVICE FOR SPINDLE SEALING AND/OR BEARING MEANS

(75) Inventors: Peter Hagqvist, Stockholm (SE); Kjell Klintenstedt, Saltsjö-Boo (SE)

(73) Assignee: Alfa Laval Corporate AB, Lund (SE)

( * ) Notice: Subject to any disclaimer, the term of this patent is extended or adjusted under 35 U.S.C. 154(b) by 927 days.

(21) Appl. No.: 13/377,378

(22) PCT Filed: Jun. 11, 2010

(86) PCT No.: PCT/SE2010/000165
§ 371 (c)(1),
(2), (4) Date: Feb. 27, 2012

(87) PCT Pub. No.: WO2010/144022
PCT Pub. Date: Dec. 16, 2010

(65) Prior Publication Data
US 2012/0138519 A1 Jun. 7, 2012

(30) Foreign Application Priority Data
Jun. 12, 2009 (SE) ........................ 0950449

(51) Int. Cl.
| | |
|---|---|
| *F16C 33/76* | (2006.01) |
| *F16J 15/32* | (2016.01) |
| *B04B 9/12* | (2006.01) |
| *F16C 33/78* | (2006.01) |

(Continued)

(52) U.S. Cl.
CPC ................. *F16J 15/324* (2013.01); *B04B 9/12* (2013.01); *F16C 33/7843* (2013.01); *F16C 37/007* (2013.01); *B04B 15/02* (2013.01); *F16C 2320/42* (2013.01)

(58) Field of Classification Search
CPC .......... B04B 9/12; B04B 15/02; F16J 15/324; F16C 33/7843; F16C 37/007; F16C 2320/42
USPC ......... 277/930; 384/456, 476; 494/14, 38, 41, 494/83
See application file for complete search history.

(56) References Cited

U.S. PATENT DOCUMENTS

| | | | |
|---|---|---|---|
| 3,765,480 A | 10/1973 | Fries | |
| 3,829,233 A * | 8/1974 | Scalzo et al. .................. | 415/110 |

(Continued)

FOREIGN PATENT DOCUMENTS

| | | |
|---|---|---|
| EP | 0051953 A1 | 5/1982 |
| EP | 0280778 A2 | 9/1988 |

(Continued)

*Primary Examiner* — Charles Cooley
*Assistant Examiner* — Shuyi S Liu
(74) *Attorney, Agent, or Firm* — MKG LLC

(57) ABSTRACT

A cooling device for cooling of a seal fixed in a non-rotatable member and with a circumferential contact surface on a rotating member. A closed ring-formed chamber is arranged in the rotating member radially inside of the seal. The chamber contains an amount of cooling medium which at normal rotating operation is both liquid and gaseous, such that the liquid cooling medium which by centrifugal forces is pressed towards the outer wall of the chamber is evaporated from the heat generated by the seal, and where a cooling member is arranged on the rotating member to cool an area radially inside of the chamber, such that the gaseous cooling medium is condensed from the cooling effect of the cooling member. The invention also relates to a centrifugal separator comprising such a cooling device.

9 Claims, 4 Drawing Sheets

(51) Int. Cl.
*F16C 37/00* (2006.01)
*B04B 15/02* (2006.01)

(56) References Cited

U.S. PATENT DOCUMENTS

| | | | |
|---|---|---|---|
| 3,882,335 A | 5/1975 | Fries | |
| 4,198,064 A | 4/1980 | Huhn | |
| 4,323,800 A | 4/1982 | Hofmann | |
| 4,334,159 A | 6/1982 | Ooki et al. | |
| 4,556,331 A * | 12/1985 | Munde et al. | 384/453 |
| 5,046,920 A * | 9/1991 | Higashi et al. | 415/111 |
| 5,201,196 A | 4/1993 | Faghri | |
| 6,210,042 B1 | 4/2001 | Wang et al. | |

FOREIGN PATENT DOCUMENTS

| | | |
|---|---|---|
| GB | 2261038 A | 5/1993 |
| JP | 57051018 A * | 3/1982 |
| JP | 58178013 A | 10/1983 |
| SE | 505761 C2 | 10/1997 |
| WO | 9807988 A1 | 2/1998 |

\* cited by examiner

COOLING DEVICE FOR SPINDLE SEALING AND/OR BEARING MEANS

FIELD

The present invention relates to a cooling device for cooling a sealing means fixed in a non-rotatable member and having contact with a circumferential surface of a rotating member.

BACKGROUND

In rotating systems where a rotating spindle is provided with bearings sealed off from the environment preventing dirt and other contamination from forcing its way into the bearing and causing damage or grease to leak out from the bearing, friction heat is bound to be generated where the sealing means is in contact with a relative rotating surface. This heat is highly unwanted as it may cause deformation and breakdown of the bearing and seal components.

In order to lower the temperature of the area where the friction heat generation takes place, the heat has to be transported away from this area by cooling.

JP 58178013 A discloses a rotating system where heat pipes have been arranged axially in the surface of the rotating spindle portioned out evenly along the circumference.

This construction may cause deformation in the surface of the spindle. The fact that this device shows discrete pipe formed heat pipe chambers also leads to uneven cooling effect around the circumference of the spindle radially inside of plural radial thrust bearings.

SUMMARY OF THE INVENTION

The present invention is directed in one aspect to a cooling device having a closed ring-formed chamber arranged in the rotating member radially inside of a sealing means, where the chamber is filled with an amount of cooling medium which at normal rotating operation is both liquid and gaseous, such that the liquid cooling medium which, by centrifugal forces, is pressed towards the outer wall of the chamber is evaporated from the heat generated by the sealing means, and where a cooling member is arranged on the rotating member to cool an area radially inside of the chamber, such that the gaseous cooling medium is condensed from the cooling effect of the cooling member.

In a further embodiment of the present invention the rotating member comprise a spindle and an inner bearing ring attached to the spindle and where the chamber is arranged at least partly in an inner bearing ring, the inner bearing ring being a part of a bearing in which the spindle is journalled.

The cooling device will then also be able to transport generated heat from the bearing and thus cool the same.

In another embodiment of the present invention the chamber also is defined by a locking ring which is arranged axially beside the inner bearing ring.

In yet another embodiment of the present invention the locking ring has a side wall with a ring-formed lip protruding axially into a groove to increase the contact area inside the ring-formed chamber.

In a further embodiment of the present invention the inner bearing ring has a ring-formed lip protruding axially into the groove to increase the contact area inside the ring-formed chamber.

In another embodiment of the present invention the cooling member is cooling fins arranged on the locking ring functioning as fan shovels.

In yet another embodiment of the present invention the spindle is journalled in two bearings arranged in parallel on the spindle and forming a bearing unit.

In another embodiment of the present invention, the spindle is a hollow spindle.

In another embodiment of the present invention the rotating member comprises a hollow spindle and an inner bearing ring and the closed ring-formed chamber is coaxially on the inner surface of the hollow spindle.

One application is a centrifugal separator comprising a cooling device according to the present invention, wherein a separator bowl is attached to the rotating member.

DESCRIPTION OF PREFERRED EMBODIMENTS OF THE INVENTION

Figure 1:
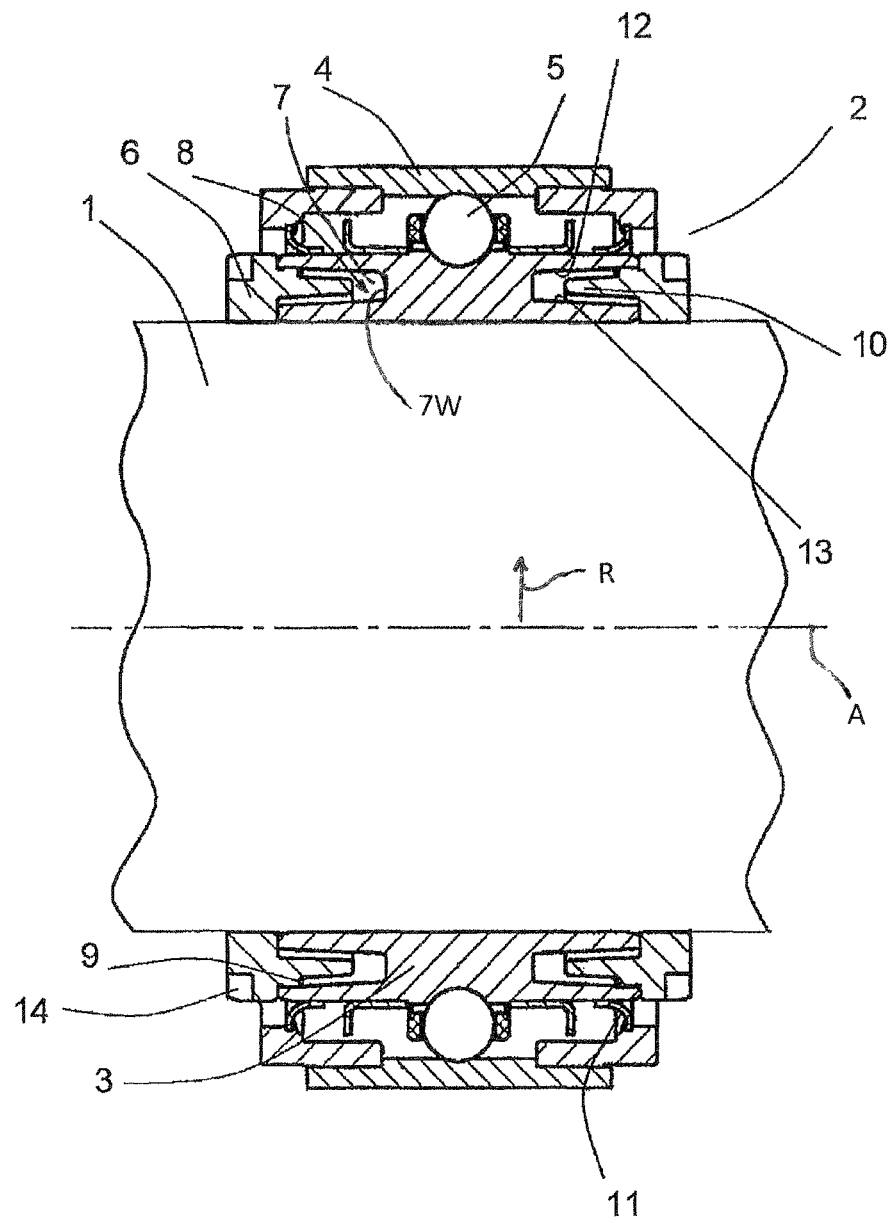
FIG. 1 discloses a side sectional view of a first embodiment of the cooling device according to the present invention.

One embodiment of a device according to the present invention is illustrated in FIG. 1. This drawing discloses a rotating spindle 1 which is rotatably mounted in an apparatus foundation (not shown) by a bearing 2. The spindle is rotable about an axis A. The bearing comprises an inner bearing ring 3 fixedly mounted on the envelope surface of the spindle 1, an outer bearing ring 4 fixedly mounted on the foundation and roller means 5 thereinbetween. On each side of the inner bearing ring 3 is a locking ring 6 arranged. The inner bearing ring 3 has a ring-formed axial groove 7 in each axial end whose axial depth is not deep enough to affect the area radially inside the bearing roller means 5. The groove 7 defines a radially extending wall 7W at the base of the groove 7. As used herein the term "axially" refers to a direction parallel to the axis A; and the term "radially" refers to a direction parallel to the arrow R, as shown in FIG. 1. As the invention is meant to be arranged in a centrifugal separator the spindle 1 has a separator bowl 35 fixedly attached to it which thus is rotating together with the spindle 1.

Each locking ring 6 together with the inner bearing ring 3 define a sealed off ring-formed chamber 8. The ring-formed chamber is defined by a radially extending circular side wall 9 of the locking ring 6 facing the inner bearing ring 3; the wall 7W of the groove 7; an axially extending outer wall 12; and an axially extending inner wall 13. The wall 7W and the circular side wall 9 are both radially extending walls and are axially spaced apart from one another. The axially extending outer wall 12 and the axially extending inner wall 13 extend between the radially extending walls, namely, the wall 7W and the circular wall 9. The circular side wall 9 of the locking ring 6 has a cooling member, for example a ring-formed lip 10 located inside the ring formed chamber 8 and protruding into the groove 7 to increase the contact area, i.e. the heat exchanging surface, inside the ring-formed chamber 8. On each side of the roller means 5 is a sealing means 11 arranged sealing off the roller means 5 from dirt coming from the outside and also keeping the grease within the bearing 2. The sealing means 11, which is a lip sealing, is fixedly arranged on a sleeve attached to the outer bearing ring 4, but may instead be attached directly to the outer bearing ring 4 and is in sealing contact with the inner bearing ring 3 and thus non-rotatable when the spindle 1 rotates. The location of the sealing means 11 is essentially radially outside the ring-formed chamber 8.

The ring-formed chamber 8 is partly filled with a liquid fluid used as cooling medium, preferably water, which at normal operating conditions, i.e. when the spindle 1 is rotating at operating speed, is partly in liquid phase, partly gaseous. The fluid thus, partly in gaseous and partly in liquid form completely fills up the chamber 8 and is in direct contact with the walls defining the chamber 8, e.g. the side wall 9.

The operating mode of the present invention in accordance with the embodiment illustrated in FIG. 1 is described below. When the spindle 1 and the separator bowl 35 starts to rotate, the liquid in the ring-formed chambers 8 on each side of the bearing 2 is pressed, by the centrifugal forces from the rotation of the spindle 1 and thus the ring-formed chambers 8, towards the radially outer wall 12 of the groove 7. This outer wall 12 is in immediate vicinity of the lip sealing which soon adapts a high operating temperature. This temperature starts to heat the cooling medium in the chamber 8 which soon starts to evaporate. This is especially true since the separator bowl 35 when in operation may rotate at 5,000 to 15,000 rpm and over.

The evaporated cooling medium is gathering in the chamber 8 radially inside of the cooling medium layer close to the radially extending inner wall 13 of the groove 7 due to lower density. There the temperature is lower and even low enough to condense the vapour to liquid again. The condensing is made more effective by the protruding ring-formed lip 10 of the locking ring 6 enlarging the condensing area of the chamber 8. The condensed cooling medium is then by the centrifugal effect transported back towards the outer wall 12 for a new evaporation-condensation cycle.

Due to the closeness of the outer wall 12 to the roller means 5 the friction heat created in the bearing 2 will to a large extent also be transported through the inner bearing ring 3 towards the inner wall 12 where the cooling by the evaporation process takes place. Thus the roller means 5 will also be cooled by the heat exchanging process of the present invention.

In order to increase the cooling effect at the inner wall 13 the exterior of the locking ring 6 is provided with cooling fins 14 in an area functioning as fan shovels when the spindle rotates, outside of the sealed off area between the two sealing means 11, and facing away from the sealing means 11 and the roller means 5 thus communicating with and cooled by the air outside of the sealed off area.

Figure 2:
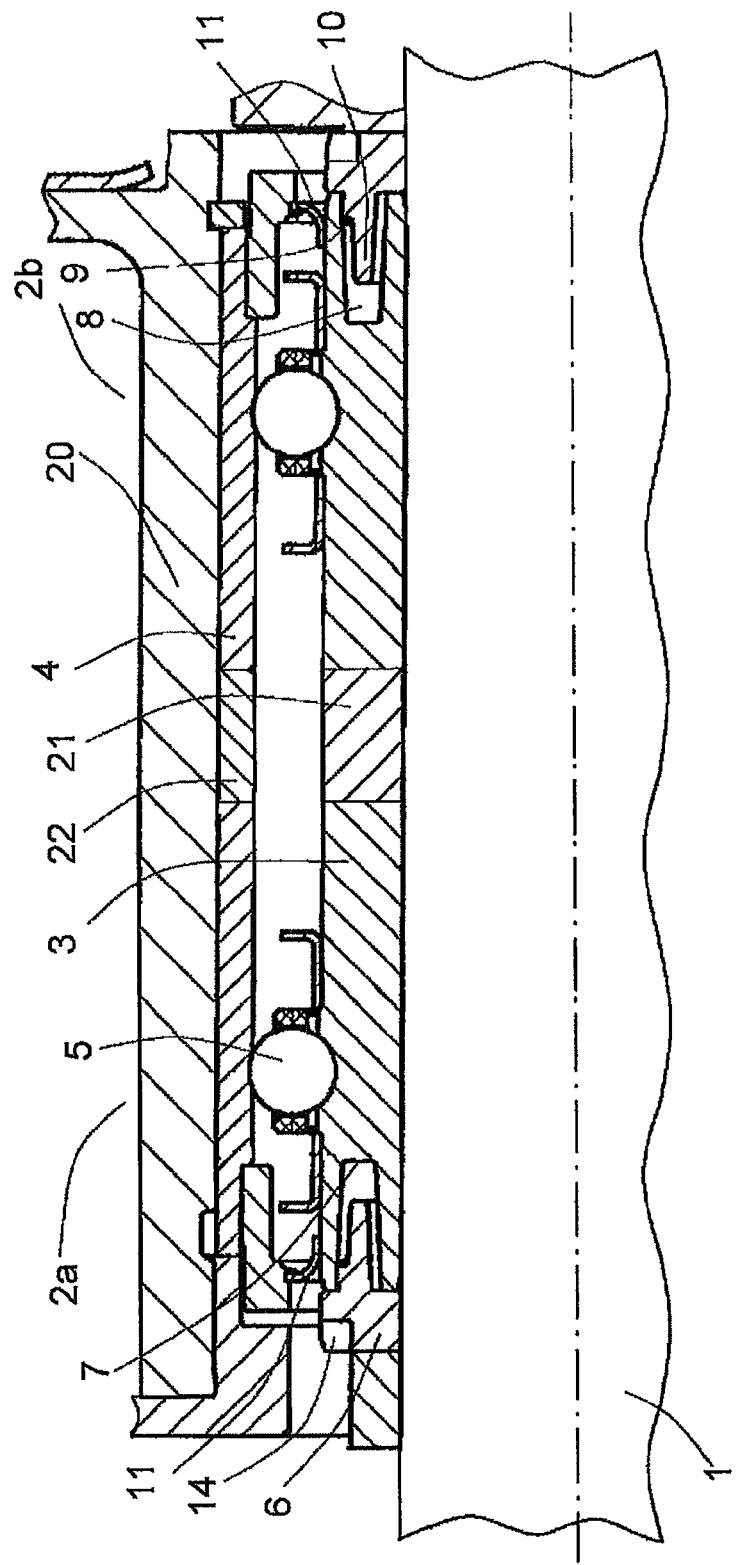
FIG. 2 discloses a side sectional view of a second embodiment of the cooling device according to the present invention.

A second preferred embodiment of an apparatus according to the present invention is illustrated in FIG. 2. This drawing discloses a rotating spindle 1 which is rotatably mounted in an apparatus foundation 20 by a first bearing 2a and second bearing 2b arranged beside each other axially. The two bearings 2a, 2b each have an inner bearing ring 3 fixedly mounted on the envelope surface of the spindle 1, and an outer bearing ring 4 fixedly mounted on the foundation 20 and roller means 5 thereinbetween. At each of the two outer ends of the inner bearing rings 3 is a locking ring 6 arranged. The inner bearing ring 3 has a ring-formed axial groove 7 in each axial end whose axial depth is not deep enough to reach the area radially inside of the bearing roller means 5. On the spindle 1, is a separator bowl 35 fixedly attached and thus rotatable together with the spindle 1.

Each locking ring 6 together with its corresponding inner bearing ring 3 define a sealed off ring-formed chamber 8 thus circumscribed by a circular side wall 9 of the locking ring 6 facing the inner bearing ring 3 and the groove 7 in the inner bearing ring 3. The circular side wall 9 of the locking ring 6 has a circular lip 10 protruding into the groove 7 to increase the contact area, i.e. the heat exchanging surface, inside the ring-formed chamber 8. On each end of the bearing arrangement comprising the first and second bearing 2a, 2b is a sealing means 11 arranged sealing off the roller means 5 by being arranged between the inner and outer bearing ring 3, 4, respectively. The sealing means 11 which is a lip sealing is fastened in the outer bearing ring 4 and is thus non-rotatable and in contact with the inner bearing ring 3. The location of the lip sealing is just radially outside the ring-formed chamber 8. Between the two inner bearing rings 3 is a first ring-formed elastic element 21 arranged to be able to absorb axial forces from the bearings 2a, 2b. Between the two outer bearing rings 4 is a second ring-formed elastic element 22 arranged also to be able to absorb axial forces from the bearings 2a, 2b.

The inner and outer bearing rings 3, 4 together with the two sealing means 11 enclosing the bearing arrangement comprising first and second bearings 2a, 2b provide a double bearing unit which is encapsulated from the outside from dirt and other contamination. The ring formed chamber 8 is partly filled with a liquid fluid, preferably water, which at normal operating conditions, i.e. when the spindle 1 is rotating at operating speed, still is partly in liquid phase. The fluid, partly in gaseous and partly in liquid form, completely fills up the chamber 8 and is in direct contact with the walls defining the chamber 8, e.g. the side wall 9.

The operating mode of the embodiment according to FIG. 2 is identical to FIG. 1.

Figure 3:
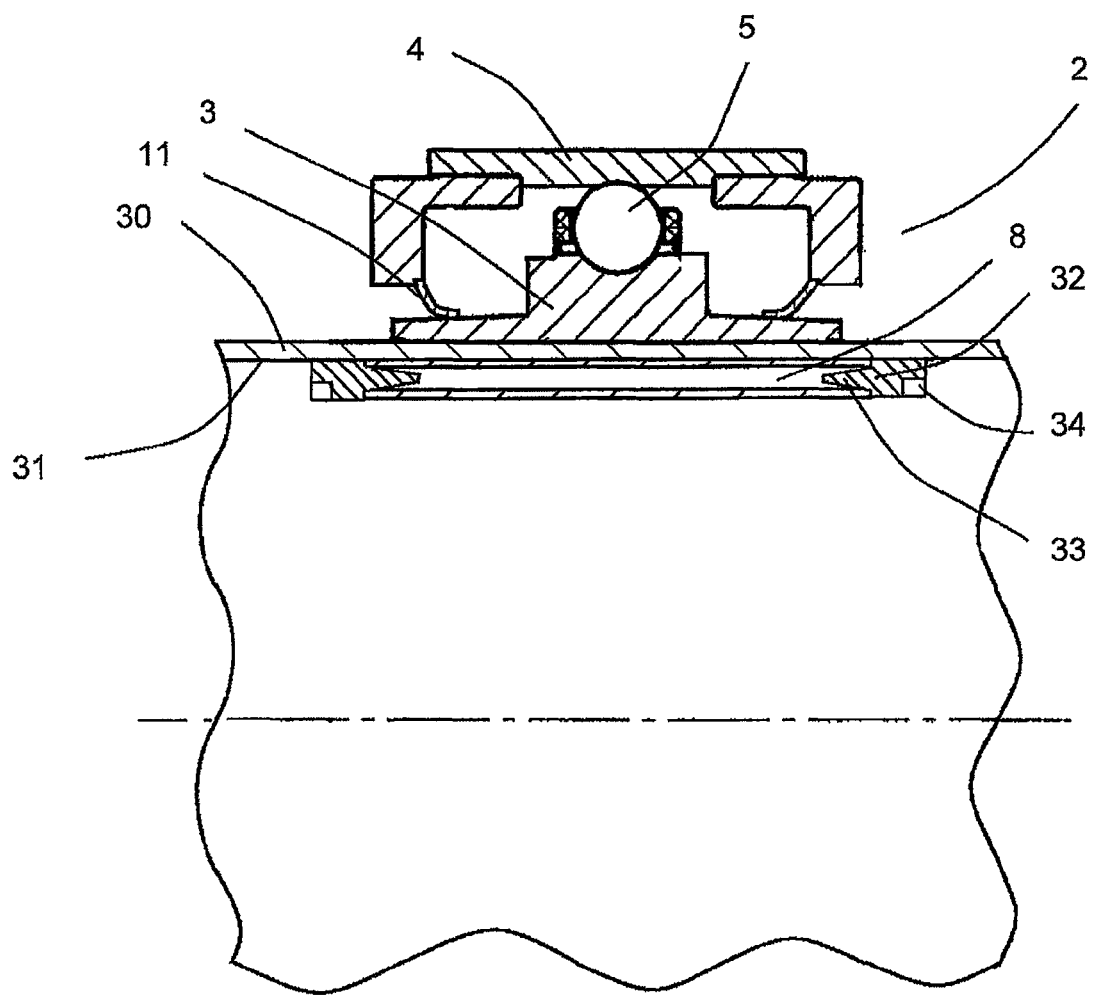
FIG. 3 discloses a side sectional view of a third embodiment of the cooling device according to the present invention.
Figure 4:
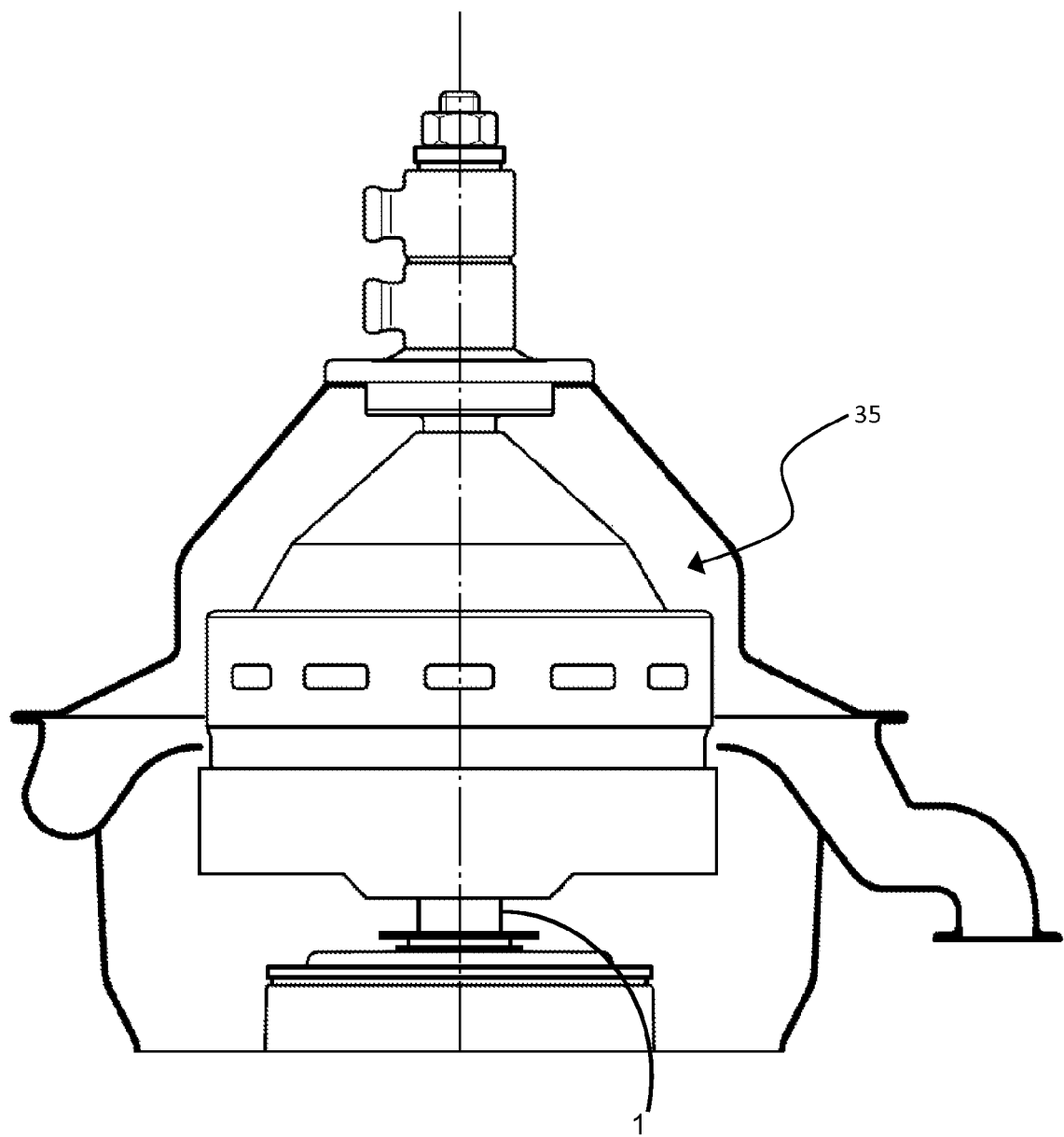
FIG. 4 discloses a cross sectional view of the cooling device, wherein a separator bowl according to present invention is shown.

A third preferred embodiment of an apparatus according to the present invention is illustrated in FIG. 3. This drawing discloses a rotating hollow spindle 30 which is rotatably mounted in an apparatus foundation (not shown) by a bearing 2. The bearing 2 comprises an inner bearing ring 3 fixedly mounted on the envelope surface of the hollow spindle 30, and an outer bearing ring 4 fixedly mounted on the foundation and roller means 5 thereinbetween. The hollow spindle 1 has a sealed off ring-formed chamber 8 arranged coaxially on its inner surface 31. The location is radially inside the inner bearing ring 3. On the spindle 30 is a separator bowl 35 fixedly attached and thus rotatable together with the spindle 30.

On each side of the roller means 5 is a sealing means 11 arranged sealing off the roller means 5 from dirt coming from the outside and also keeping the grease within the bearing 2. The sealing means 11, which is a lip sealing, is fixedly arranged on a sleeve attached to the outer bearing ring 3, but may instead be attached directly to the outer bearing ring 3 and is in sealing contact with the inner bearing ring 4 and thus non-rotatable when the spindle rotates. The location of the sealing means 11 is essentially radially outside the ring-formed chamber 8.

The ring-formed chamber 8 is partly filled with a liquid fluid, preferably water, which at normal operating conditions, i.e. when the hollow spindle 30 is rotating at operating speed, is partly in liquid phase, partly gaseous. The fluid, partly in gaseous and partly in liquid form, completely fills up the chamber 8 and is in direct contact with the walls defining the chamber 8, e.g. the side wall 9.

The ring-formed chamber 8 is defined by end rings 32 arranged axially on each side of the chamber 8. Each end ring 32 has a circular lip 33 protruding axially into the chamber 8 to increase the contact area inside the same, i.e. the heat exchanging surface. On each end of the bearing 2 is a sealing means 11 arranged sealing off the roller means 5 by being arranged between the inner and outer bearing ring 3, 4. The sealing means 11, which is a lip sealing means, is fastened in the outer bearing ring 4 and is thus non-rotatable and in contact with the inner bearing ring 3. The location of the lip sealing is radially outside the ring-formed chamber 8.

The exterior of the end rings 32 is provided with cooling fins 34 in an area functioning as fan shovels when the spindle rotates, communicating with and being cooled by the air outside of the chamber 8.

The operating mode of the embodiment according to FIG. 3 is identical to FIG. 1.

As has been indicated the invention operates with good effect in separator applications but may well be used in other types of rotating systems where excessive heat release from friction in sealing means between the spindle or axle and the non-rotatable part or from bearing means. Such systems may include pumps, fans, electric motors etc. It is evident that many alternatives, modifications and variations of the present invention will be apparent to a person skilled in the art in light of this disclosure and all such alternatives, modifications and variations are intended to be included within the scope of the appended claims.

What is claimed is:

1. A cooling device comprising:
    a non-rotatable member;
    a rotating member having a radially outward facing circumferential surface, the rotating member being rotatable about an axis of rotation and being rotatably positioned at least partially in the non-rotating member;
    a seal fixedly secured to the non-rotatable member and a portion of the seal being in sliding engagement with the radially outward facing circumferential surface;
    a closed ring-formed chamber defined by radially extending walls and axially extending walls arranged in the rotating member radially inside of said seal, said radially extending walls being spaced axially apart from one another, said chamber defining a heat transfer surface extending axially between the radially extending walls, said heat transfer surface being configured to absorb heat generated by said seal;
    a cooling member arranged on said rotating member in said closed ring-formed chamber and positioned axially between said radially extending walls, the cooling member defining at least one condensation promoting surface positioned radially inward from the heat transfer surface;
    a cooling medium disposed in said chamber, during rotational operation of said rotating member said cooling medium comprises a liquid and a gas;
    said rotating member being configured to centrifugally force said liquid to engage said heat transfer surface, said heat transfer surface being configured to evaporate a portion of said liquid into the gas;
    said at least one condensation promoting surface being configured to condense said gas into said liquid; and
    wherein said heat transfer surface and said at least one condensation promoting surface cooperate to cause heat transfer therebetween in a radial direction.

2. A cooling device according to claim 1, wherein said rotating member comprises a spindle and an inner bearing ring attached to said spindle and wherein said chamber is arranged at least partly in said inner bearing ring, said inner bearing ring being a part of a bearing in which said spindle is journalled.

3. A cooling device according to claim 2, wherein said chamber also is defined by a locking ring which is arranged axially beside the inner bearing ring.

4. A cooling device according to claim 3, wherein said locking ring defines one of the radially extending walls and a ring-formed lip protrudes axially from the locking ring into a ring-formed axial groove to increase the contact area inside the ring-formed chamber, wherein the ring-formed lip has a radially outward facing surface in communication with the cooling medium and a radially inward facing surface in communication with the cooling medium.

5. A cooling device according to claim 3, further comprising cooling fins arranged on said locking ring, the cooling fins functioning as fan shovels.

6. A cooling device according to claim 2, wherein said spindle is journalled in two bearings arranged in parallel on said spindle and forming a bearing unit.

7. A cooling device according to claim 2, wherein said spindle is a hollow spindle.

8. A cooling device according to claim 1, wherein said rotating member comprises a hollow spindle and an inner bearing ring and wherein said closed ring-formed chamber is coaxially on the inner surface of the hollow spindle.

9. A centrifugal separator comprising a cooling device according to claim 1, wherein a separator bowl is attached to said rotating member.

* * * * *